United States Patent [19]

Landfahrer et al.

[11] Patent Number: 5,044,159
[45] Date of Patent: Sep. 3, 1991

[54] EXHAUST SYSTEM FOR TWO-STROKE CYCLE ENGINES

[75] Inventors: Klaus Landfahrer; Hans Alten; Diethard Plohberger; Christof D. Fischer; Karl Wojik, all of Graz, Austria

[73] Assignee: AVL Gesellschaft für Verbrennungskraftmaschinen und Messtechnik M.B.H. Prof.Dr.Dr.h.c. Hans List, Graz, Austria

[21] Appl. No.: 496,639

[22] Filed: Mar. 21, 1990

[30] Foreign Application Priority Data

Mar. 23, 1989 [AT] Austria .................. 695/89
Aug. 31, 1989 [AT] Austria ................. 2058/89

[51] Int. Cl.$^5$ ............................. F02B 27/02
[52] U.S. Cl. ................................... 60/314
[58] Field of Search .......................... 60/314

[56] References Cited

U.S. PATENT DOCUMENTS 4,178,685 12/1979 Inaga ...................... 60/314

FOREIGN PATENT DOCUMENTS 2534969 4/1984 France ........................ 60/314

Primary Examiner—Douglas Hart
Attorney, Agent, or Firm—Watson, Cole, Grindle & Watson

[57] ABSTRACT

In an exhaust system for two-stroke cycle engines, comprising an exhaust pipe whose front end, which is characterised by a constant cross-section, is followed by two or more conical sections, these conical sections are configured as diffusers, which are connected to the front end of the exhaust pipe with its constant cross-section by means of branch pipes of different length, and which open into a common exhaust header at the other end, which header in turn is connected to the exhaust tail pipe comprising a catalytic converter and/or a silencer. This arrangement has the effect that a pressure wave coming from the cylinder is twice reflected as a suction wave arriving at the still open exhaust port at different times due to the difference in pipe length. In this manner the effective duration of the suction wave is prolonged over that of comparable exhaust systems of a known kind.

13 Claims, 5 Drawing Sheets

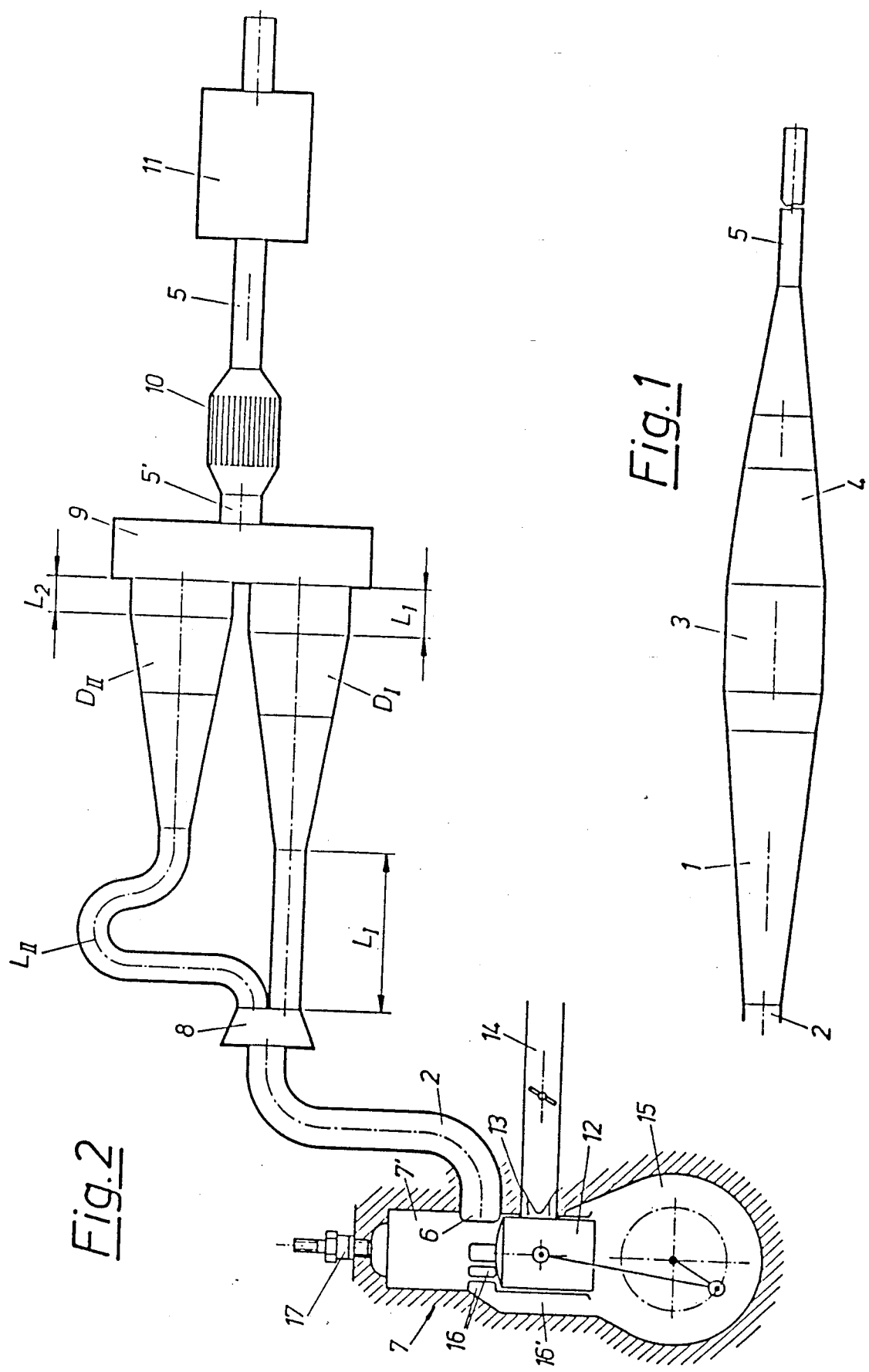

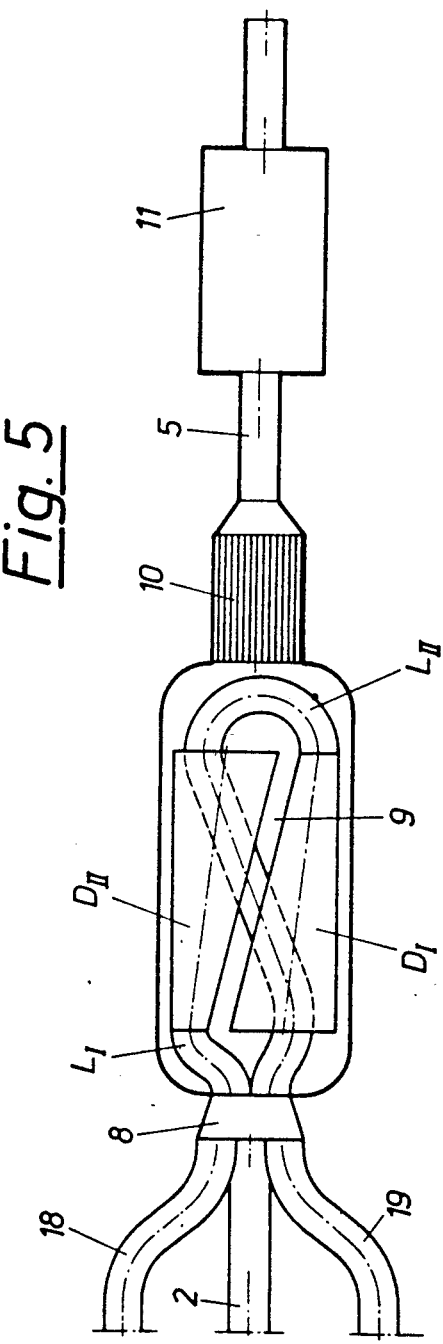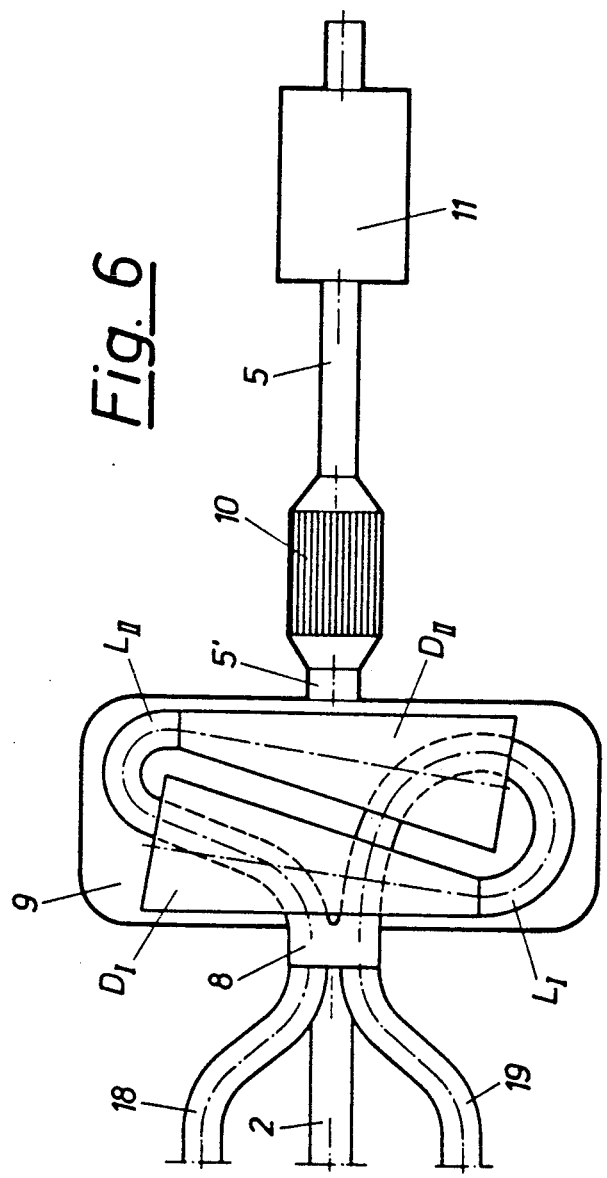

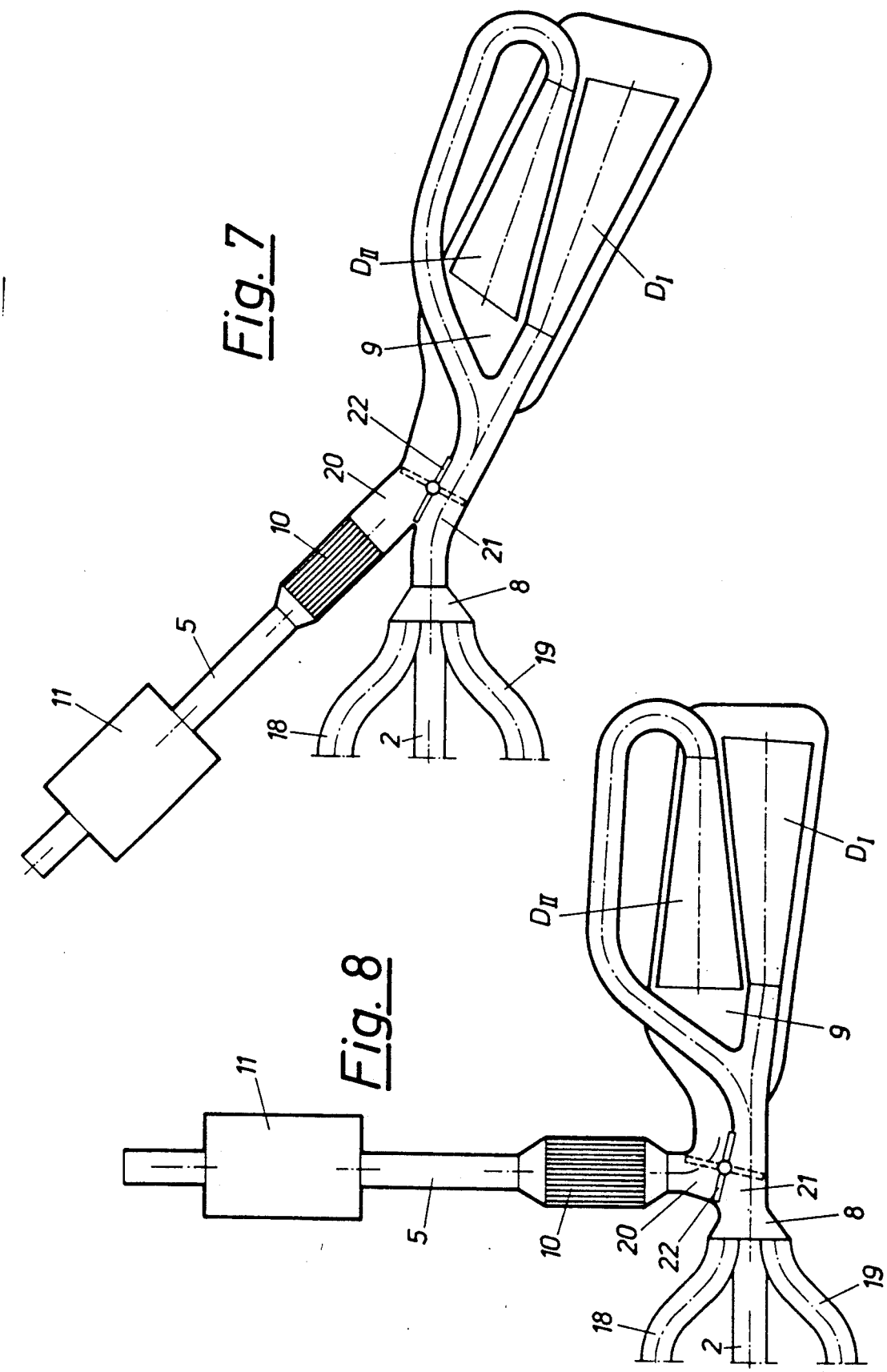

EXHAUST SYSTEM FOR TWO-STROKE CYCLE ENGINES

BACKGROUND OF THE INVENTION

This invention relates to an exhaust system for two-stroke internal combustion engines comprising an exhaust pipe whose front end, which is characterised by a constant cross-section, is followed by two or more conical sections.

DESCRIPTION OF THE PRIOR ART

In known systems of this type the pipe end departing from the exhaust port has a constant cross-section. This part is followed by a diffuser used for generating a retrograde suction wave, which diffuser in turn leads to a conical counter-section or a baffle, with a short piece of pipe situated in between. In this area of reduced cross-section a pressure wave is generated which is propagated towards the cylinder, supplying the cylinder chamber with fresh air, which had entered the exhaust pipe during the scavenging phase by flowing through the intake port and the cylinder chamber.

The use of such engines with high power ratings mostly is restricted to a very narrow r.p.m. range, since performance of these engines drops rapidly at lower r.p.m. values. This is due to the gas-dynamic processes in the exhaust system, which have a strong influence on the gas exchange during the scavenging phase, and thus on engine performance.

Upon the opening of the exhaust port a strong pressure wave is propagated into the exhaust pipe. During its passage through the diffuser a retrograde wave is generated, which is carried to the still open exhaust port into the cylinder, reducing the pressure in the cylinder. On the other hand the pressure wave passing through the diffuser is reflected as a pressure wave after it has reached the conical counter-section or baffle, arriving at the cylinder chamber at a time different to that of the suction wave (later because of its greater travel distance). The cylinder is charged with additional air from the exhaust pipe.

SUMMARY OF THE INVENTION

It is an object of this invention to avoid the drawbacks of the known systems and to propose an exhaust system for two-stroke-cycle engines with an arbitrary number of cylinders, which will permit a marked improvement of the torque characteristic within a wide r.p.m. range.

In the invention this object is achieved by configuring the conical sections as diffusers, which are connected to the front end of the exhaust pipe characterized by a constant cross-section by means of branch pipes of different lengths, and to a common exhaust header on the other end, which in turn is connected to the exhaust tail pipe comprising a catalytic converter and/or a silencer.

This system will cause a pressure wave coming from the cylinder to be reflected twice as a suction wave, the two wave arriving at the exhaust port, which has not yet been closed, at different times due to their different travel distances. In this way the effective duration of the suction wave is prolonged as compared to the conventional exhaust system described above.

Since the ends of the two diffusers connected in parallel are additionally connected via a common chamber, such as a pipe, a pressure wave returns to the cylinder after it has passed the two diffusers, re-charging the cylinder with fresh air from the exhaust end.

In further development of the invention in a two-stroke multi-cylinder engine the exhaust pipes from all cylinders are connected to a single small-volume exhaust header, which in turn is connected to two branch pipes of different lengths, each leading to a diffuser. If the pipe lengths are matched carefully, the suction wave from the first diffuser may be used for damping the reflexion at the other cylinders of the first pressure pulse generated by the opening of the exhaust port. The suction wave from the second diffuser may then be used for increasing the throughput of air.

According to the invention connecting pieces of different lengths may be provided between the two diffusers and the header. This will facilitate proper dimensioning of the exhaust system as proposed by the invention.

In an enhanced variant of the invention the exhaust header is made of two parts, which are connected with each other by a pipeline of defined length, and each of which receives one of the two branch pipes via the diffusers. The timing of the suction waves is given by the lengths of the two branch pipes; the travelling time of the pressure wave is determined by the overall length of the two branches including the length of the pipeline between the two parts of the header. By varying the volume of the header the intensity of the pressure pulse may be influenced.

In a preferred version of the invention the catalytic converter is integrated in the header.

In an enhanced variant both diffusers are located in the header, the latter also establishing the flow connection between the diffuser outlets.

If a catalytic converter is used the reduction of pollutants is closely linked with the temperature of the exhaust gas. This temperature is low at low loads and during the starting phase, in particular for two-stroke engines. In order to avoid further cooling of the exhaust gases due to heat transfer at the surface of the exhaust pipe, it is proposed in a further development of the invention that the inlet passage of the feed pipe into the exhaust header and the outlet passage of this pipe from the header into the tail pipe be combined, and that a control element be provided in this area, preferably a control valve directing the flow of exhaust gases into the header through the two diffusers in one extreme position, and connecting feed pipe and tail pipe while bypassing the header in the other extreme position. In this way the "cold" exhaust gases at low loads are diverted to immediately enter the catalytic converter, whereas the double-diffuser system is activated at high loads, and the exhaust gases enter the catalytic converter from the header.

The position of the throttle valve is controlled either by fast acting temperature control devices or by an electromagnetic element via the control of performance characteristics. In the invention the longer of the two branch pipes and its corresponding diffuser may be located inside and coaxial with the shorter branch and its diffuser. The special advantage of this variant is that the header is followed by a long pipe of comparatively small diameter. This will greatly facilitate the placing of the exhaust system in the narrow engine compartment, regardless of the orientation the engine. As the surface of the enveloping pipe is smaller than that of a comparable system with two separate pipes, the response time of the catalytic converter is reduced advantageously by the shorter heat-up time.

In a preferred variant of the invention the header basically is configured as a pipe, and the diffuser connected to the longer of the two branch pipes is shorter than the header and is entirely contained within it, whereas the diffuser connected to the shorter branch pipe opens into the header via a short piece of pipe only.

In another variant of the invention the pipe forming the header has an oval cross-section whose center is traversed by the diffuser connected to the longer of the two branch pipes, and the two residual cross-sections along the longitudinal axis of the oval cross-section are swept by the exhaust gases coming from the second diffuser.

BRIEF DESCRIPTION OF THE DRAWINGS

Following is a more detailed description of several variants of the invention, as illustrated by the schematical views given in the accompanying drawings, in which FIG. 1 shows a conventional exhaust system, FIG. 2 shows an exhaust system according to the invention, FIG. 3 gives a comparison of characteristics demonstrating the operation of the exhaust system of the invention, FIGS. 4 to 8 each give a further variant of the invention, FIG. 9 gives an axial section of another variant of the invention, FIG. 10 gives a section along line X—X in FIG. 9, and FIG. 11 gives a section along line XI—XI in FIG. 10.

Identical parts, or parts with similar functions, have identical reference numbers.

DETAILED DESCRIPTION OF PREFERRED EMBODIMENTS

Figure 3:
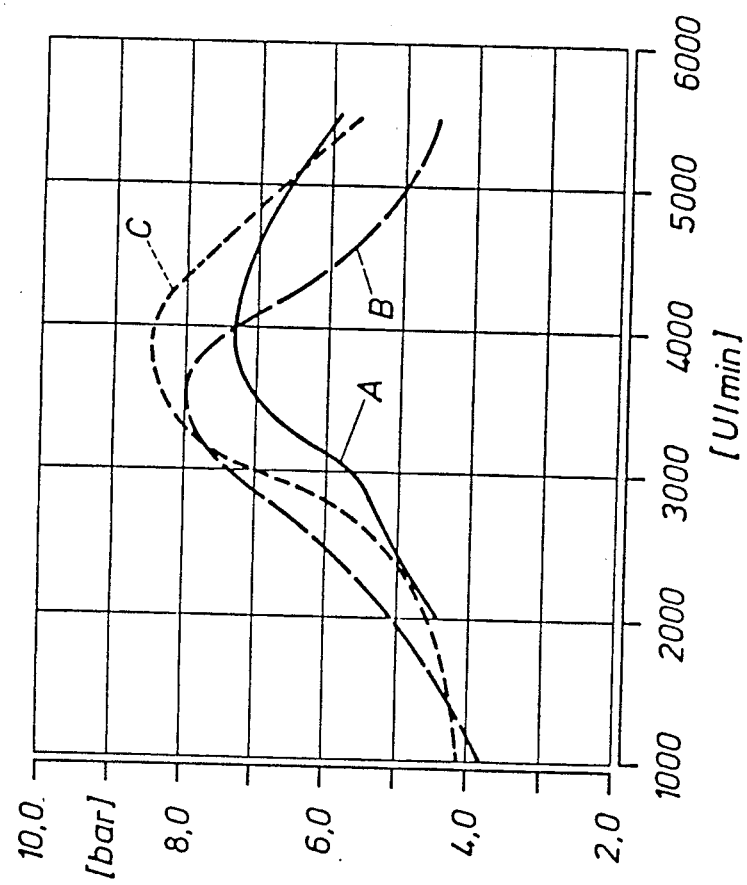

The conventional exhaust system shown in FIG. 1 comprises a diffuser 1, which is connected to a pipe 2, which in turn is connected to the exhaust port of the engine and is characterized by a constant cross-section. The diffuser 1 is in flow-connection with a conical counterpart 4 via a short cylindrical intermediate pipe 3. The conical counterpart 4 opens into the tail pipe 5, which is shown here only in part.

In the variant of the invention shown in FIG. 2 the exhaust pipe of constant cross-section connected to the exhaust port 6 in the cylinder 7' of the two-stroke engine 7 ends in a small-volume header 8 to which are connected two branch pipes of different length, LI and LII. The shorter branch LI leads into the diffuser DI, and the longer branch LII into the diffuser D II. The two diffusers DI and DII open into the header 9 via connecting pieces of different length, L1 and L2, such that the two branches LI and LII are in flow-connection both via the small-volume header 8 and the header 9. To the header 9 is connected the tail pipe 5 via the catalytic converter 10 and a short piece of pipe 5'. The tail pipe 5 is provided with a silencer 11. The piston 12 of the two-stroke engine 7 controls the intake opening 13 for the air/fuel mixture admitted into the crankcase 15 through the intake pipe 14, in addition to the intake ports 16 in the cylinder 7' for the air compressed by the piston, and the exhaust port 6.

When the piston 12 moves downwards it first opens the exhaust port 6, such that the majority of the exhaust gases escape through the exhaust system. Scavenging of the cylinder is effected as the piston 12 continues its downward stroke and the intake ports 16 are opened, which are connected with the crankcase 15 via passages 16', whereupon the air compressed by the piston 12 in the crankcase 15 will enter the cylinder, displacing the exhaust gas remaining therein and forcing it into the pipe 2 through the exhaust port 6 with a minimum of lost air. The spark plug has the reference number 17.

The exhaust system of the invention may also be employed in diesel engines, where the spark plug 17 is replaced by an injection nozzle and the intake pipe carries the combustion air.

Figure 4:
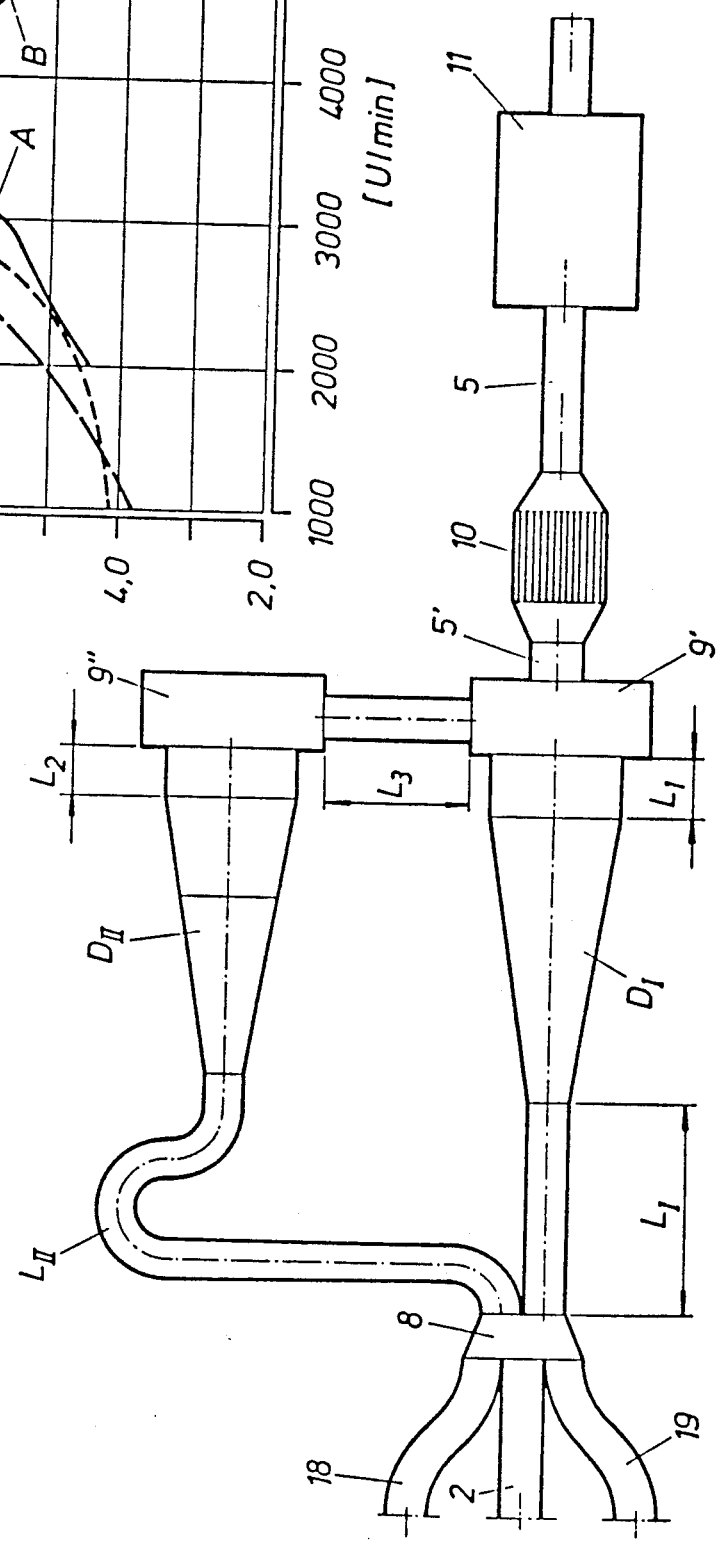

The exhaust system represented in FIG. 4 is designed for a three-cylinder engine; for this purpose three pipes of constant cross-section are provided, i.e. 2, 18, 19, for connection to the individual cylinders. The three exhaust pipes 2, 18, 19 end in the small-volume header 8, to which are connected the branch pipes LI and LII, which in turn connect to the diffusers DI and DII. The diffusers again are connected via pieces of pipe L1 and L2 to a header, which in this instance consists of two parts, 9' and 9''. The two header parts 9' and 9'' are connected with each other by the pipe L3. The tail pipe 5 is connected to the header part 9' via the catalytic converter 10 and the pipe piece 5', and leads into the open via the silencer 11.

The operation of the exhaust system of the invention is illustrated by the relationship between mean pressure and speed as shown in FIG. 3. Curve A, which is represented by a full line, refers to an optimized-performance single-diffuser system, curve B, a broken line, refers to the maximum torque of a single-diffuser system, and the broken line C to a double-diffuser exhaust system according to the invention. This comparison indicates clearly that the exhaust system of the invention is superior, in particular in the speed range of 3,000 to 5,000 r.p.m.

FIG. 5 shows a variant of the invention in which the diffusers DI and DII as well as the pieces of pipe LI and LII are integrated in the header 9. The header 9 whose cross-section is rectangular, is placed such that its longitudinal axis coincides with the flow-direction of the exhaust gases. The catalytic converter 10 may also be integrated into the header 9. The shape of the header 9 may vary according to the overall design; it is important, however, that it should establish the flow-connection between the outlets of the diffusers.

The variant of FIG. 6 differs from that in FIG. 5 only by the header 9 being placed at right angles to the main direction of flow of the exhaust gases, and by the catalytic converter 10 being connected to the header 9 by means of a piece of pipe 5'.

In the variants of FIGS. 7 and 8 the outlet passage 20 into the catalytic converter 10 and the inlet passage 21 of the exhaust gases into the diffusers DI and D2 are located next to each other. In the position indicated by a broken line a control valve 22 situated in this area cuts off the diffusers DI and DII and effects a direct discharge of the exhaust gases through the catalytic converter 10, which quickly heats up in this way, especially at low power. In the position of the control valve 22 indicated by a full line the exhaust gases flow through the diffusers DI and DII and subsequently into the header 9, from where they are discharged via the catalytic converter 10.

Figure 10:
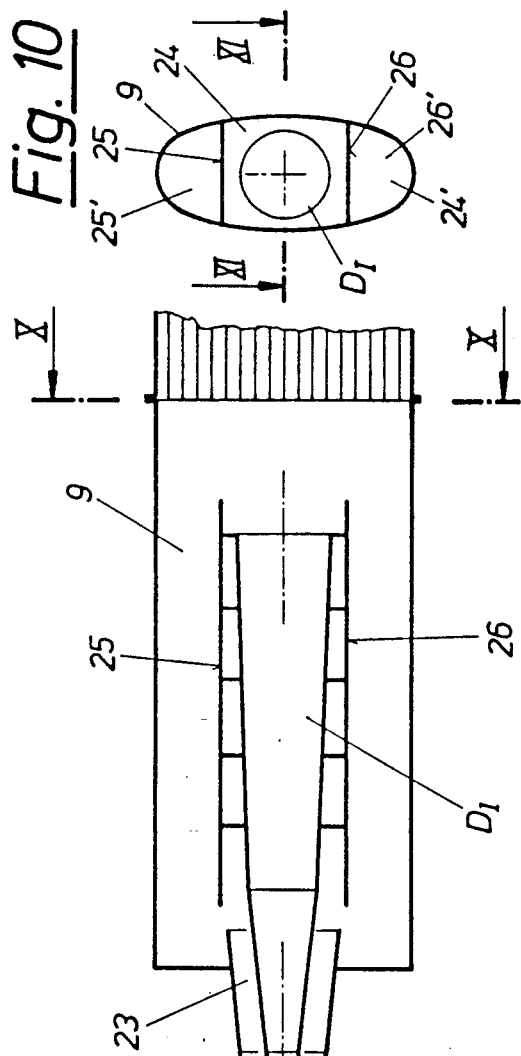
Figure 9:
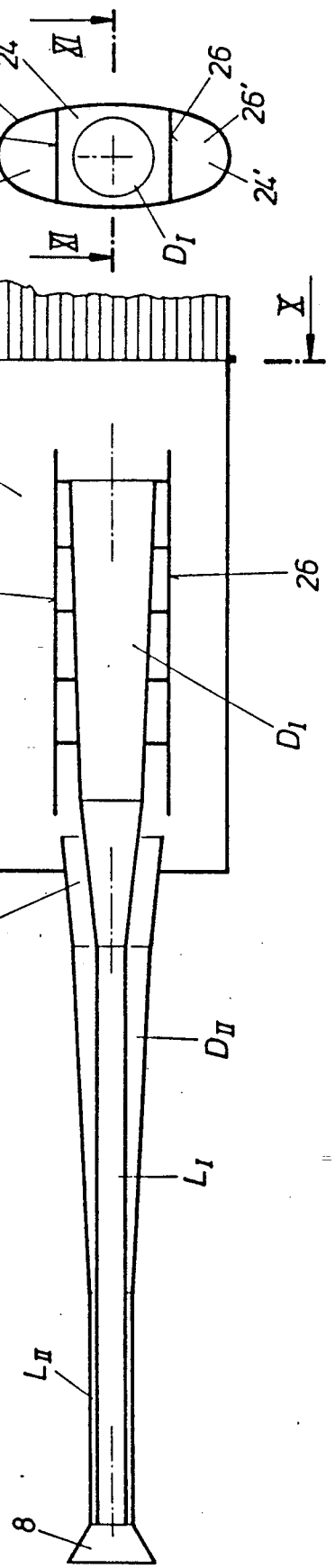
Figure 11:
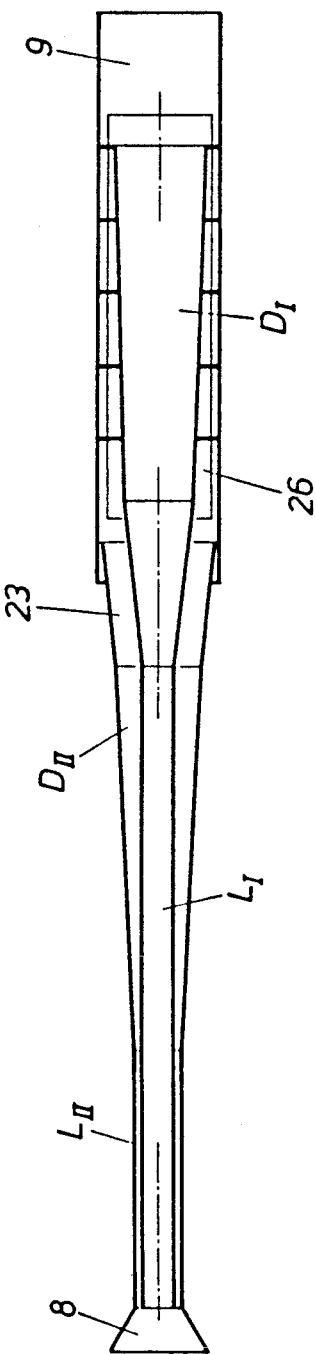

In the variant of FIGS. 9 to 11 two coaxial pipes LI and LII are connected to the small-volume header 8, of which the inner pipe LI is much longer than the outer pipe LII. Pipe LI is connected to the diffuser DI, and pipe LII to the diffuser DII. Both diffusers open into the header 9, i.e. diffuser DII with a short piece of pipe 23 only, whereas the entire diffuser DI is contained within the header 9 and is much shorter than the header. The header 9 has an oval cross-section 24, which is partitioned by two longitudinal walls 25, 26 in the area of the diffuser DI, such that two flow cross-sections 25', 26' are formed along the longitudinal axis 24' of the oval cross-section 24. The exhaust gas coming from the diffuser DII and entering the header 9 through the connecting piece 23 passes these cross-sections 25', 26' in the direction towards the outlet. The catalytic converter may be inserted into the cylindrical part of the pipes, or—as is shown in FIG. 2 and indicated by the reference number 10—it may be added behind the header 9.

What is claimed is:

1. An exhaust system for two-stroke internal combustion engines comprising at least one exhaust pipe with a front end, which is characterized by a constant cross-section, wherein said front end of said exhaust pipe is connected to a first and a second conical section, by means of first and second branch pipes of different lengths, wherein said conical sections are configured as diffusers which are connected to an exhaust header which in turn is connected to an exhaust tail pipe.

2. An exhaust system for multi-cylinder two-stroke internal combustion engines according to claim 1, wherein all of said exhaust pipes are connected to a single small-volume header, which in turn is connected to said first and second branch pipes of different lengths, each leading to one of said diffusers.

3. An exhaust system according to claim 1, wherein connecting pieces of different lengths are provided between said two diffusers and said exhaust header.

4. An exhaust system according to claim 1, wherein said exhaust header comprises two parts which are connected by a pipeline of defined length, and each of said two parts receives one of said first and second branch pipes via said first and second diffusers.

5. An exhaust system according to claim 1, wherein said exhaust tail pipe comprises a catalytic converter and a silencer.

6. An exhaust system according to claim 1, wherein a catalytic converter is integrated into said exhaust header.

7. An exhaust system according to claim 1, wherein said first and second diffusers are located in said exhaust header.

8. An exhaust system according to claim 3, wherein said first and second diffusers are located in said exhaust header.

9. An exhaust system according to claim 7, wherein said exhaust header also establishes a flow-connection between the outlets of said first and second diffusers.

10. An exhaust system according to claim 9, comprising an exhaust header with combined inlet and outlet passages, wherein in a common area of said inlet passage into said exhaust header and said outlet passage into said tail pipe a control element is provided, directing the flow of exhaust gases into said exhaust header through said two diffusers in one extreme position of said control element, and the flow of exhaust gases into said tail pipe while bypassing said exhaust header in an other extreme position of said control element.

11. An exhaust system according to claim 1, wherein said first branch pipe and said corresponding first diffuser is located inside and coaxial with said second branch pipe and said corresponding second diffuser, and wherein said first branche pipe is longer than said second branche pipe.

12. An exhaust system according to claim 11, wherein said exhaust header basically is configured as a pipe, and wherein said first diffuser connected to the longer of said two branch pipes is shorter than said exhaust header and is entirely contained within said exhaust header, whereas said second diffusor connected to the shorter of said two branch pipes opens into said exhaust header via a short piece of pipe.

13. An exhaust system according to claim 12, wherein said pipe forming said exhaust header has an oval cross-section whose center is traversed by said first diffuser connected to the longer of said two branch pipes, and wherein two residual cross-sections along the longitudinal axis of said oval cross-section are swept by exhaust gases coming from said second diffuser.

* * * * *

UNITED STATES PATENT AND TRADEMARK OFFICE
CERTIFICATE OF CORRECTION

PATENT NO. : 5,044,159

DATED : September 3, 1991

INVENTOR(S) : Klaus LANDFAHRER et al.

It is certified that error appears in the above-identified patent and that said Letters Patent is hereby corrected as shown below:

Title page, item [73], the Assignee should read

> AVL Gesellschaft fur Verbrennungskraftmaschinen und Messtechnik M.B.H. Prof.Dr.Dr.h.c. Hans List Signed and Sealed this Twenty-ninth Day of December, 1992

*Attest:*

DOUGLAS B. COMER

*Attesting Officer*      *Acting Commissioner of Patents and Trademarks*